(12) United States Patent
Lukiyanov et al.

(10) Patent No.: US 8,108,421 B2
(45) Date of Patent: Jan. 31, 2012

(54) QUERY THROTTLING DURING QUERY TRANSLATION

(75) Inventors: Maxim S. Lukiyanov, Kirkland, WA (US); Hor Siu Ivan Han, Bellevue, WA (US); Edward G. Sheppard, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 493 days.

(21) Appl. No.: 12/414,360

(22) Filed: Mar. 30, 2009

(65) Prior Publication Data

US 2010/0250575 A1   Sep. 30, 2010

(51) Int. Cl.
   *G06F 17/30* (2006.01)
(52) U.S. Cl. ....................................................... 707/770
(58) Field of Classification Search .................. 707/764, 707/770
   See application file for complete search history.

(56) References Cited

U.S. PATENT DOCUMENTS

| | | | |
|---|---|---|---|
| 6,473,750 B1 | 10/2002 | Petculescu | |
| 6,691,102 B2 | 2/2004 | Chang | |
| 6,859,798 B1 | 2/2005 | Bedell | |
| 6,938,044 B1 | 8/2005 | Milby | |
| 7,058,626 B1 * | 6/2006 | Pan et al. | 707/999.004 |
| 7,330,846 B1 * | 2/2008 | Dirisala et al. | 707/754 |
| 7,376,638 B2 | 5/2008 | Gordon | |
| 7,647,298 B2 * | 1/2010 | Adya et al. | 707/999.002 |
| 7,680,779 B2 * | 3/2010 | Chaves | 707/770 |
| 7,984,031 B2 * | 7/2011 | Chordia et al. | 707/705 |
| 2007/0078812 A1 | 4/2007 | Waingold | |
| 2009/0012948 A1 | 1/2009 | Koch | |
| 2009/0089334 A1 * | 4/2009 | Mohamed et al. | 707/200 |
| 2009/0144229 A1 * | 6/2009 | Meijer et al. | 707/2 |

OTHER PUBLICATIONS

"LINQ to Entities Flow of Execution," http://msdn.microsoft.com/en-us/library/bb738693.aspx, printed Jan. 30, 2009, 4 pages.
"Query Translation for Distributed Information Gathering on the Web," http://ieeexplore.ieee.org/stamp/stamp.jsp?arnumber=00694381, downloaded Jan. 29, 2009 from IEEE Xplore, 10 pages.
"The Internet Query Engine™ Architecture," http://www.interquery.com/technology_architecture.htm, printed Jan. 30, 2009, 4 pages.
"Tracking inefficient queries . . . ," http://marcusoh.blogspot.com/2005/08/tracking-inefficient-queries.html, printed Jan. 30, 2009, 5 pages.
"Unsupported Linq Operations," http://www.mindscape.co.nz/forums/Post.aspx?ThreadID=1376&PostID=2437, printed Jan. 30, 2009, 1 page.

* cited by examiner

*Primary Examiner* — James Trujillo
*Assistant Examiner* — Jorge A Casanova
(74) *Attorney, Agent, or Firm* — Merchant & Gould P.C.

(57) ABSTRACT

A computer determines whether an original query expressed in an initial query language includes clauses unsupported by a target query language. If so, the computer separates the original query into a client-side query and one or more server-side queries. The computer then determines whether the client-side query is efficient. If so, the computer translates the one or more server-side queries into one or more supplemental queries expressed in the target query language and receives server-side result sets for the supplemental queries. The computer generates a client-side result set by querying the server-side result sets using the client-side query. The computer returns the client-side result set as a result set of the original query. If the client-side query is not efficient, the computer returns an error message. Thus, by identifying inefficient queries, the computer effectively controls (i.e., throttles) the amount of work performed by the computer to process queries.

19 Claims, 5 Drawing Sheets

QUERY THROTTLING DURING QUERY TRANSLATION

BACKGROUND

Applications use queries to access data stored in databases. Queries can be expressed in a variety of ways. Some techniques of expressing queries are more expressive than other techniques of expressing queries. For example, queries expressed in the Structured Query Language (SQL) are potentially more expressive than queries expressed in the Collaborative Application Markup Language (CAML).

In some circumstances, it may be advantageous to use a less expressive query language instead of a more expressive query language. For example, it may be more difficult to administer a first database supporting queries expressed in SQL than it is to administer a second database supporting queries expressed in CAML. In this example, the structure of the second database may be simpler than the structure of the first database and may require a less complex database management system.

Many programmers are familiar with expressive query languages, such as SQL and the Language Integrated Query (LINQ) query language. Consequently, many applications include queries expressed in a query language that is more expressive than a query language supported by a targeted database. In some circumstances, queries in an unsupported query language can be translated into one or more queries in a supported query language. However, translating a query from an unsupported query language into one or more queries in a supported query language may be computationally expensive. Moreover, executing the resulting queries in the supported query language may also be computationally expensive. In addition, there may be some queries in an unsupported query language that cannot be translated into one or more queries in a supported query language.

SUMMARY

A computer determines whether an original query expressed in an initial query language includes clauses unsupported by a target query language. If so, the computer separates the original query into a client-side query and one or more server-side queries. The computer then determines whether the client-side query is efficient. If so, the computer translates the one or more server-side queries into one or more supplemental queries expressed in the target query language and receives server-side result sets for the supplemental queries. The computer generates a client-side result set by querying the server-side result sets using the client-side query. The computer returns the client-side result set as a result set of the original query. If the client-side query is not efficient, the computer returns an error message. Thus, by identifying inefficient queries, the computer effectively controls (i.e., throttles) the amount of work performed by the computer to process queries.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

As briefly described above, a computing system effectively throttles the amount of work performed by the computing system to process queries by identifying inefficient queries. The technologies of this disclosure are explained with reference to the attached figures. It should be appreciated that the figures are provided as examples. Reference numbers in this disclosure refer to like reference numbers in the attached figures.

Figure 1:
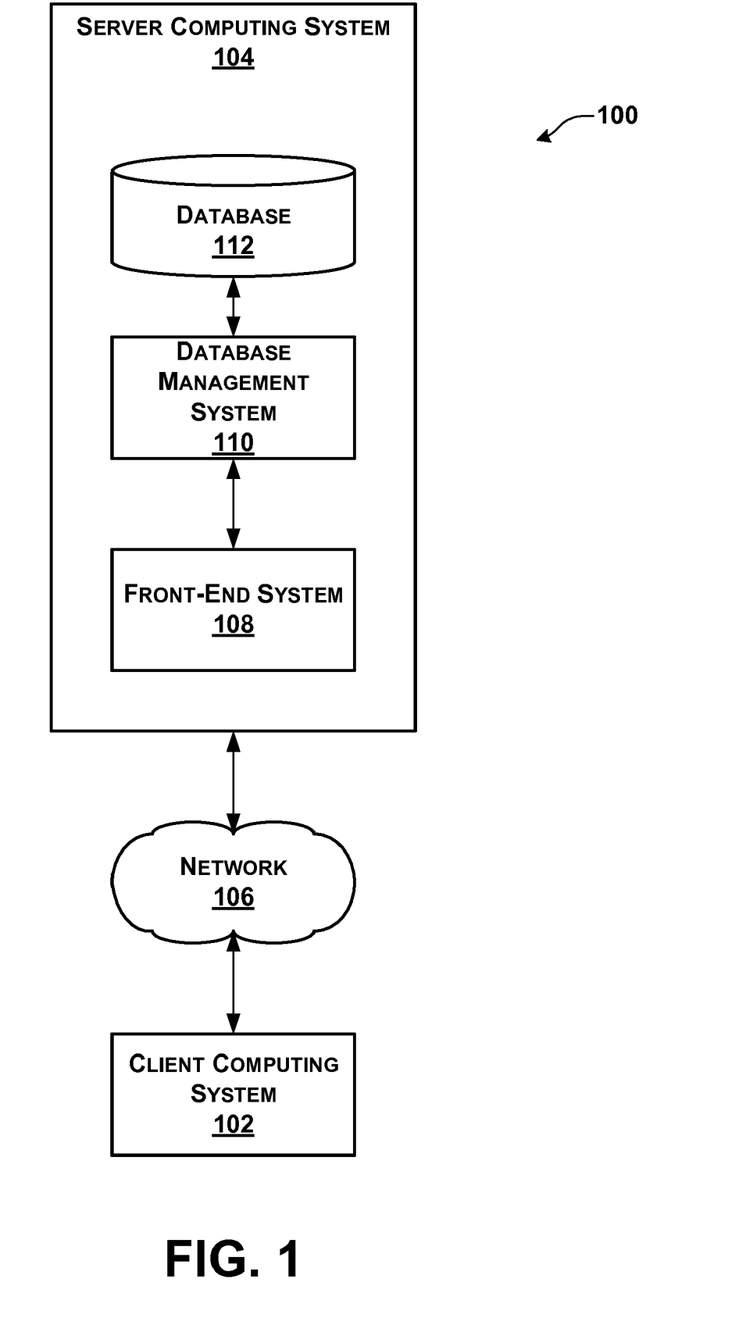
FIG. 1 is a block diagram illustrating an example system.

FIG. 1 is a block diagram illustrating an example system 100. It is to be understood that system 100 is merely one example. The techniques of this disclosure may be implemented in many other ways. For instance, other systems implementing the techniques of this disclosure may include more or fewer components, systems, connections, and so on.

As illustrated in the example of FIG. 1, system 100 includes a client computing system 102. Client computing system 102 is an electronic computing system. As used in this disclosure, an electronic computing system is a set of one or more electronic computing devices. This disclosure describes details of an example electronic computing device with reference to FIG. 5. Client computing system 102 may include a wide variety of different types of electronic computing devices. For example, client computing system 102 may include a personal computer, a mobile telephone, a personal digital assistant (PDA), a digital media player, a television set top box, a television, a home appliance, an industrial appliance, a device integrated into a vehicle, a video game console, an Internet kiosk, a netbook, a laptop computer, a handheld video game device, an intermediate network device, a standalone server device, a server blade device, a network storage device, an Automated Teller Machine, a wearable computing device or another type of electronic computing device.

In addition to client computing system 102, system 100 includes a server computing system 104. Server computing system 104 is an electronic computing system. Like client computing system 102, server computing system 104 may include a wide variety of different types of electronic computing devices. For instance, server computing system 104 may include any of the types of electronic computing devices described above.

System 100 also includes a network 106. Network 106 is an electronic communication network. Network 106 facilitates electronic communication between client computing system 102 and server computing system 104. Network 106 may be implemented in a variety of ways. For example, network 106 may be a wide-area network, such as the Internet. In other examples, network 106 may be a local-area network, a metropolitan-area network, or another type of electronic communication network. Network 106 may include wired and/or wireless data links. A variety of communications protocols may be used in network 106. Such communications protocols include, but are not limited to, Ethernet, Transmission Control Protocol (TCP), Internet Protocol (IP), Hypertext Transfer Protocol (HTTP), SOAP, remote procedure call (RPC) protocols, user datagram protocol (UDP), IPSec, Resource Reservation Protocol (RSVP), Internet Control Message Protocol (ICMP) and/or other types of communications protocols.

In the example of FIG. 1, server computing system 104 includes a front-end system 108 and a database management system 110. Database management system 110 manages a database 112 stored at a data storage system within server computing system 104. Database management system 110 is configured to receive queries expressed in a target query language and provide result sets responsive to the queries. The target query language may be a variety of different query languages including, but not limited to Structured Query Language (SQL), XQuery, Collaborative Application Markup Language (CAML), and other query languages. Database 112 may be implemented in a variety of ways. For example, database 112 may be a relational database, an Online Analytical Processing (OLAP) database, an object-oriented database, an associative database, or another type of database.

As described in detail below, front-end system 108 receives an original query from a querying client. The original query is expressed in an initial query language. The initial query language is different than the target query language. In response to receiving the original query, front-end system 108 determines whether the original query includes one or more clauses or sub-clauses unsupported by the target query language. Example types of clauses include from clauses, select clauses, where clauses, group by clauses, and so on. A sub-clause is a discrete part of a clause. For example, a "where" clause of query in the initially query language may include the following sub-clauses "row>'A'" and "row not contains 'B'". In this example, "row>'A'" may be unsupported and "row not contains 'B'" may be supported. If front-end system 108 determines that the original query does not include any unsupported clauses or sub-clauses, front-end system 108 translates the original query into a supplemental query expressed in the target query language, provides the supplemental query to database management system 110, and returns a result set of the supplemental query as the result set of the original query.

As described in detail below, if front-end system 108 determines that the original query include clauses or sub-clauses unsupported by the target query language, front-end system 108 separates the original query into a client-side query and one or more server-side queries. The server-side queries comprise supported clauses of the original query. The client-side query comprises unsupported clauses of the original query. In this disclosure, the server-side queries are so named because database management system 110 acts as a server for front-end system 108 and because database management system 110 processes the server-side queries. In this disclosure, the client-side query is so named because front-end system 108 acts as a client to database management system 110 and because front-end system 108 processes the client-side query.

After separating the original query into the client-side query and the one or more server-side queries, front-end system 108 determines whether the client-side query is efficient. In one example implementation, front-end system 108 may determine that the client-side query is efficient when the client-side query does not require retrieval of redundant data from database 112. If the client-side query is efficient, front-end system 108 translates the one or more server-side queries into one or more supplemental queries expressed in the target query language. Front-end system 108 then provides the supplemental queries to database management system 110 and receives server-side result sets for these supplemental queries from database management system 110. In this disclosure, the server-side result sets are so named because the server-side result sets are generated at the server (i.e., database management system 110). Front-end system 108 then generates a client-side result set by querying the server-side result sets using the client-side query. In this disclosure, the client-side result set is so named because the client-side result set is generated at the client (i.e., front-end system 108). Front-end system 108 then returns the client-side result set to the querying client. Front-end system 108 generates an error if the client-side query is not efficient. Thus, by only processing queries considered to be efficient, front-end system 108 effectively controls (i.e., throttles) the amount of work performed by server computing system 104 to process queries.

In the example of FIG. 1, client computing system 102 initiates queries expressed in the target query language. Client computing system 102 may initiate the queries in a variety of ways. For example, client computing system 102 may send a request to server computing system 104, the request containing a uniform resource locator (URL). In this example, the URL may be associated at front-end system 108 with an extensible markup language (XML) file containing a query expressed in the target query language. In this example, front-end system 108 responds to the request by retrieving and processing the XML file to generate a resource (e.g., a web page) identified by the URL. When front-end system 108 processes the XML file, front-end system 108 initiates the query contained in the XML file. In another example, client computing system 102 may use the SOAP protocol to send a query expressed in the target query language to a remotely-accessible method provided by front-end system 108. In this second example, front-end system 108 initiates the query in response to receiving the query at the remotely-accessible method.

Front-end system 108 and database management system 110 may be implemented in a variety of ways. For instance, front-end system 108 and database management system 110 may be implemented on the same physical computing devices or on separate physical computing devices within server computing system 104. When front-end system 108 and database management system 110 are implemented on separate physical computing devices within server computing system 104, these physical computing devices may communicate via an electronic communication network.

Figure 2:
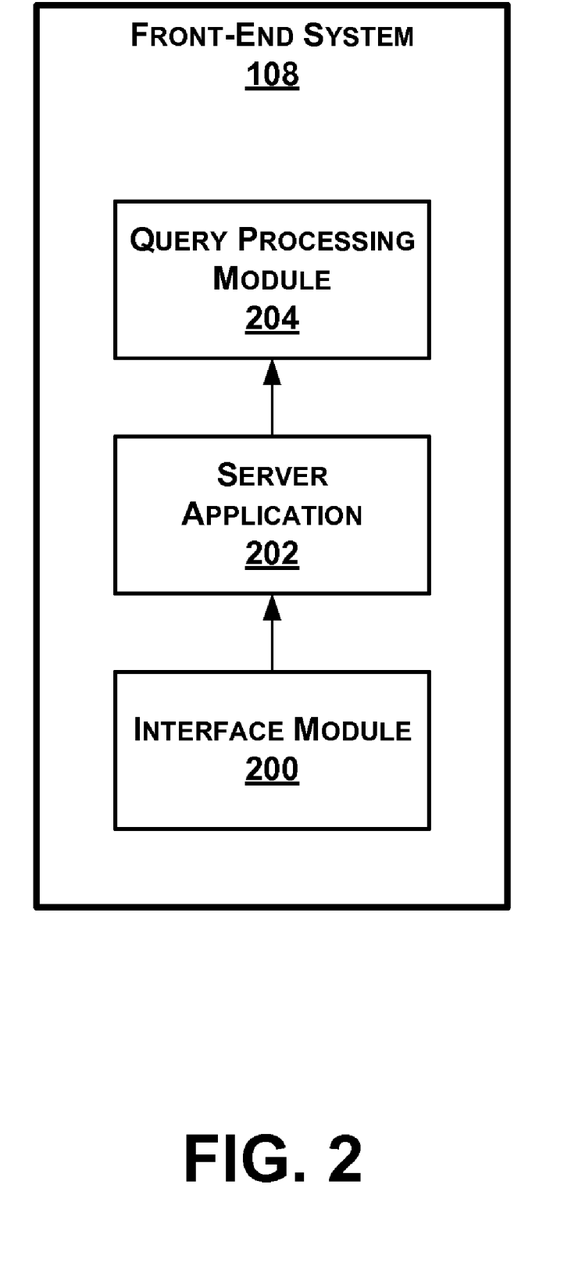
FIG. 2 is a block diagram illustrating example logical components of a front-end system.

FIG. 2 is a block diagram illustrating example logical components of front-end system 108. It should be appreciated that logical details in FIG. 2 are provided for explanatory purposes only and are not intended to represent a sole way of logically organizing front-end system 108. Rather, many other logical organizations of front-end system 108 are possible.

As illustrated in the example of FIG. 2, front-end system 108 comprises an interface module 200, a server application 202, and a query processing module 204. Interface module 200 enables front-end system 108 to communicate electronically with computing systems on network 106. For instance, interface module 200 may enable front-end system 108 to communicate electronically with client computing system 102.

In one example implementation, server application 202 receives resource requests from interface module 200. For instance, server application 202 may receive a HTTP request from interface module 200. In this example implementation, server application 202 may need to execute one or more queries to process the resource request. Server application 202 may use query processing module 204 to process such queries.

In another example implementation, server application 202 may use query processing module 204 to process queries without first receiving a resource request via interface module 200. For instance, server application 202 may use query processing module 204 to process queries in response to a resource request from an application operating at front-end system 108. In another instance, server application 202 may use query processing module 204 to process queries without first receiving any resource request from another application.

In this disclosure, interface module 200, server application 202 and query processing module 204 are referred to as functional modules of front-end system 108. The functional modules of front-end system 108 may be implemented in a wide variety of ways. In a first example, one or more of the functional modules of front-end system 108 may be implemented as sets of instructions stored at a data storage system. In this first example, a processing unit within front-end system 108 may execute the sets of instructions, thereby causing front-end system 108 to perform the behaviors associated with one or more of the functional modules of front-end system 108. As used in this disclosure, a processing unit is a set of one or more physical electronic integrated circuits that are capable of executing instructions. In a second example, one or more of the functional modules of front-end system 108 are implemented as one or more application-specific integrated circuits (ASICs). The ASICs cause front-end system 108 to perform the behaviors associated with one or more of the functional modules of front-end system 108. In this second example, the ASICs may be specifically designed to perform the behaviors associated with one or more of the functional modules of front-end system 108.

Figure 3:
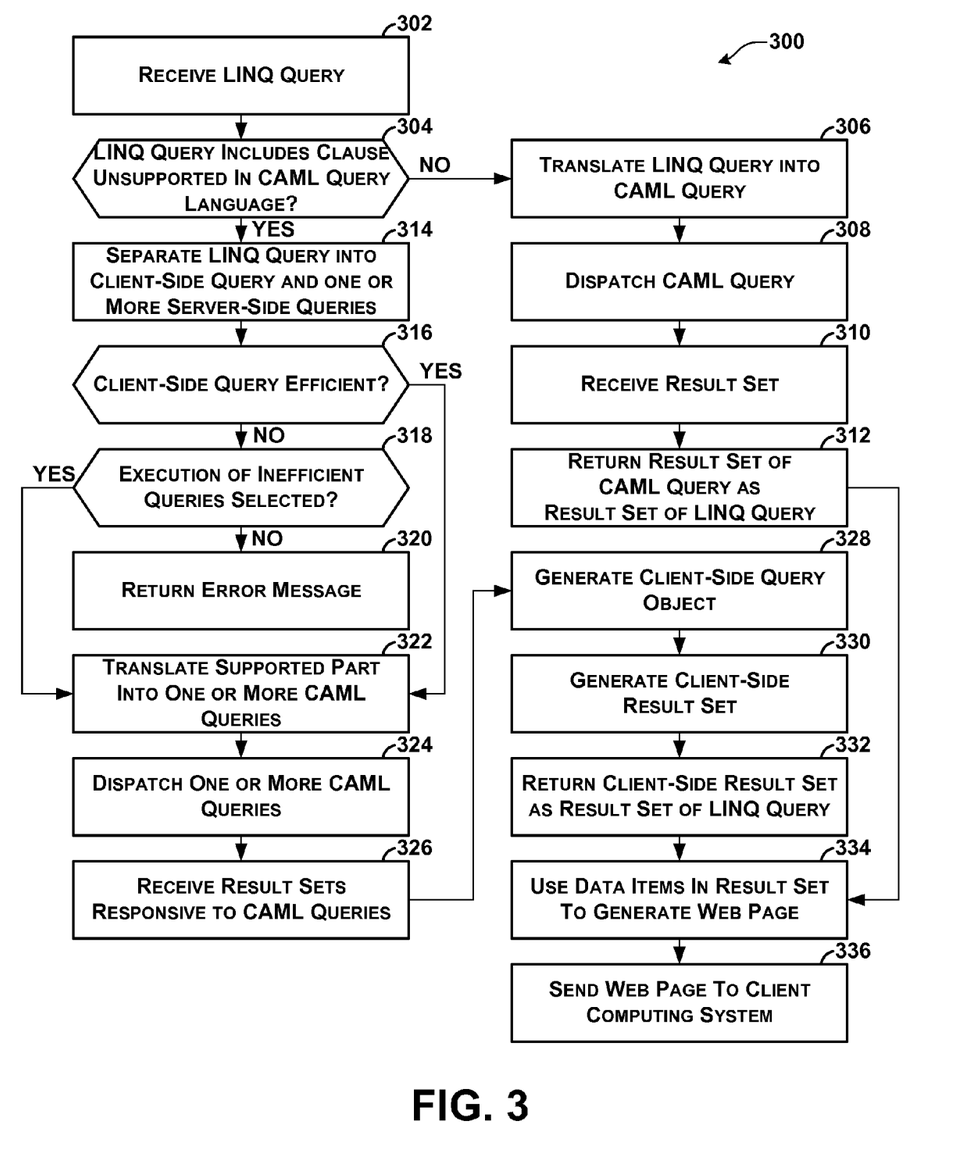
FIG. 3 is a flowchart illustrating an example operation of the front-end system.

FIG. 3 is a flowchart illustrating an example operation 300 of query processing module 204. It should be appreciated that operation 300 is merely an example operation of query processing module 204. Many other operations of query processing module 204 are possible. For instance, other operations of query processing module 204 may include more or fewer steps. In other instances, operations of query processing module 204 may include the steps of operation 300 in different orders.

This disclosure describes query processing module 204 as receiving Language Integrated Query (LINQ) queries and generating CAML queries. LINQ is an example query language having greater expressiveness than CAML. It should be appreciated that in other implementations, other query languages could be used.

Operation 300 begins when query processing module 204 receives a LINQ query from a querying client (302). In one example implementation, query processing module 204 receives the LINQ query from server application 202. In other example implementations, query processing module 204 may receive the LINQ query from another application at server computing system 104, an application at client computing system 102, or an application operating elsewhere.

After receiving the LINQ query, query processing module 204 automatically determines whether the LINQ query includes a clause unsupported by the CAML query language (304). As used in this disclosure, a first clause in a first query language is supported by a second query language when the second query language is able to fully express the first clause.

Query processing module 204 may determine whether the LINQ query includes a clause unsupported by the CAML query language in a variety of ways. In a first example, query processing module 204 may scan through the clauses of the LINQ query to determine whether the LINQ query contains any clause keywords that cannot be expressed in the CAML query language. A clause keyword is a word identifying a type of the clause. In one example implementation, the following LINQ clauses cannot be expressed in the CAML query language: join, sum, aggregate, average, max, min, skip<(Of TSource>), SkipWhile, ElementAt<(Of TSource>), ElementAtOrDefault<(Of TSource>), Last, LastOrDefault, All<(Of TSource>), Any, Distinct, Except, Intersect, Reverse, and SequenceEqual. In this first example, query processing module 204 determines that the LINQ query includes clauses unsupported in the CAML query language when the LINQ query contains one of these clause keywords. In a second example, query processing module 204 may determine whether the LINQ query includes one or more select clauses referring to subparts of data objects. In this second example, the CAML query language is unable to express queries having select clauses referring to subparts of objects. Consequently, in this second example, query processing module 204 determines that the LINQ query includes a clause unsupported by the CAML query language when the LINQ query includes one or more select clauses referring to subparts of objects. It should be appreciated that query processing module 204 may use both the technique described in the first example and the technique described in the second example to determine whether the LINQ query includes clauses unsupported by the CAML query language.

In response to determining that the LINQ query does not include any clauses unsupported by the CAML query language ("NO" of 304), query processing module 204 automatically translates the LINQ query into a CAML query (306). In other words, query processing module 204 generates a query expressed in the CAML query language having the same result set as the LINQ query.

After translating the LINQ query into the CAML query, query processing module 204 automatically dispatches the CAML query (308). As used in this disclosure, dispatching a query means using the query to retrieve a result set responsive to the query. Query processing module 204 may dispatch the CAML query in a variety of ways. In a first example, query processing module 204 may dispatch the CAML query by directly sending the CAML query to database management system 110. In a second example, database management system 110 may be configured to process SQL queries. In this second example, query processing module 204 may dispatch the CAML query by translating the CAML query into a SQL query and then sending the SQL query to database management system 110. SQL is a more expressive query language than CAML. Consequently, all CAML queries are fully supported by one or more SQL queries. In other words, for any given CAML query there is one SQL query having the same result set as the CAML query.

After dispatching the CAML query, query processing module 204 automatically receives a result set of the CAML query (310). The result set of the CAML query is a set of data items responsive to the CAML query. For example, a table in database 112 may contain ten data items with the identifier "5". In this example, if the CAML query requests data items in the table having the identifier "5", the result set of this CAML query includes the ten items in the table having the identifier "5." Query processing module 204 may receive the result set in a variety of ways. For example, query processing module 204 may receive a software object containing the result set of the CAML query. In another example, query processing module 204 may receive a serialized version of the result set of the CAML query.

When query processing module 204 has received the result set of the CAML query, query processing module 204 automatically returns the result set of the CAML query to the querying client as a result set of the LINQ query (312). In one example implementation, query processing module 204 may return the result set of the CAML query as a software object representing the result set of the CAML query. In this example implementation, the software object may include methods or operators enabling the querying client to iterate through data items in the result set of the CAML query.

On the other hand, if query processing module 204 determines that the LINQ query includes one or more clauses unsupported by the CAML query language ("YES" of 304), query processing module 204 automatically separates the LINQ query into a client-side query and one or more server-side queries (314). The server-side queries are queries comprising supported clauses of the LINQ query. The client-side query is a query comprising unsupported clauses of the LINQ query. In other words, the client-side query is a part of the LINQ query that cannot be fully expressed by one or more CAML queries.

Query processing module 204 may separate the LINQ query into the client-side query and the server-side queries in a variety of ways. For example, all LINQ queries include a from clause and a select clause or a group clause. The from clause specifies a data source. The select clause specifies one or more types of data members of data items. A group clause produces a sequence of groups organized by a key. In addition, a LINQ query may include one or more where clauses, an order by clause, a join clause, a let clause, or an additional from clause. The where clause specifies a filter defined by a set of one or more predicate rules. An aggregation clause defines an aggregation of data in a data set. Example aggregation clauses include count clauses, max clauses, min clauses, average clauses, first clauses, and so on.

In this example, query processing module 204 parses the LINQ query into an expression tree. In this example, the expression tree includes a node for each clause in the node. For instance, a "query" node of the expression tree represents the LINQ query as a whole, a "from" node of the expression tree represents the from clause of the LINQ query, a "where" node of the expression tree represents a where clause of the LINQ query, and a "select" node of the expression tree represents a select clause of the LINQ query. In this instance, the "query" node is the root node of the expression tree and the "from" node, the "where" node, and the "selected" node are child nodes of the "query" node. Furthermore, in this instance, the expression tree may include a "table" node and a "database" node, the "table" node and the "database" node being children of the "from" node. The "table" node represents a table indicated by the "from" clause of the LINQ query and the "database" node represents a database indicated by the "from" clause. Continuing this example, the expression tree may include a first predicate node and a second predicate node, the first predicate node and the second predicate node being child nodes of the "where" node. The first predicate node representing a first predicate of the where clause of the LINQ query and the second predicate node representing a second predicate of the where clause of the LINQ query.

Continuing the above example, query processing module 204 identifies each unsupported node in the expression tree. The unsupported nodes being nodes representing clauses unsupported by the CAML query language. Query processing module 204 then copies each unsupported node and the ancestor nodes of the unsupported nodes into the client-side query. Query processing module 204 then removes the unsupported nodes and their descendant nodes from the expression tree. If there are any supported child nodes of an unsupported node, these child nodes become independent server-side queries. The remaining nodes in the expression tree represent a server-side query.

Figure 4:
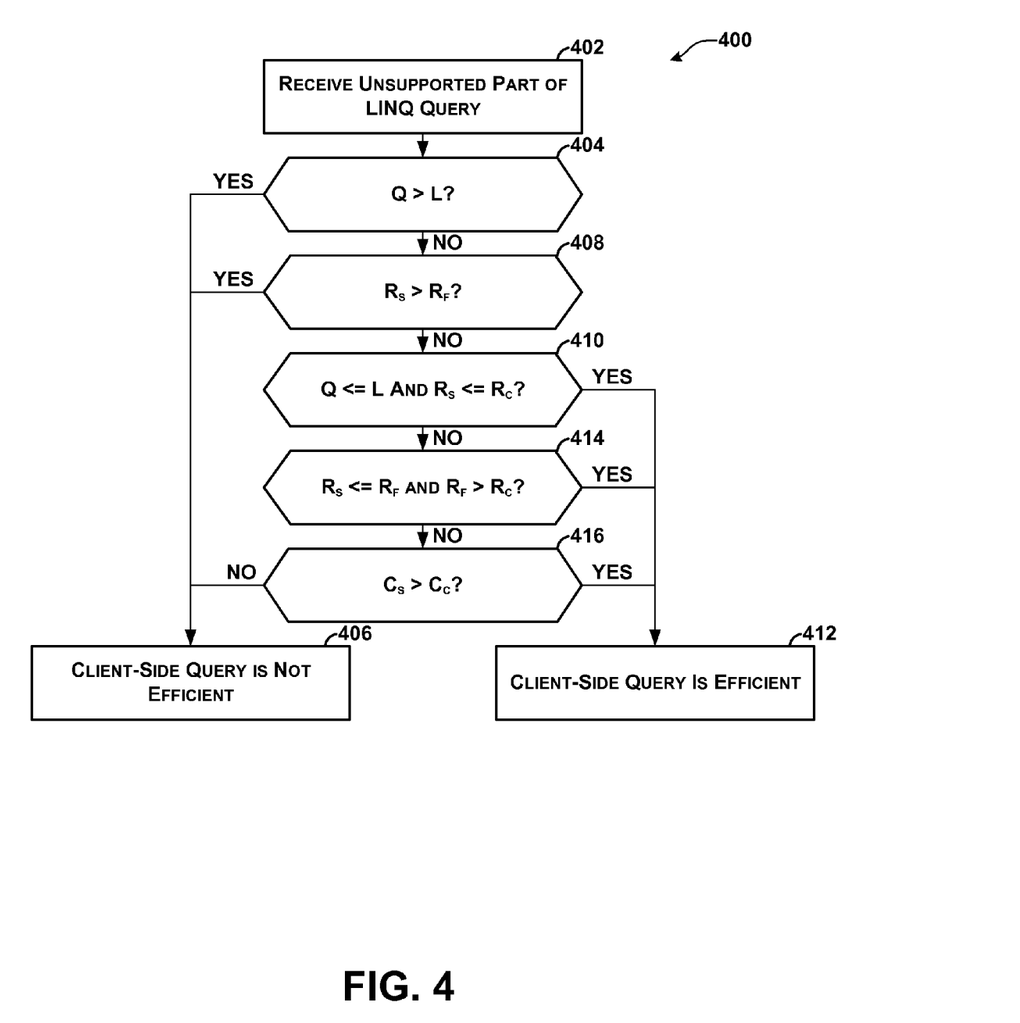
FIG. 4 is a flowchart illustrating an example operation of the front-end system to determine whether a client-side query is efficient or inefficient.

After separating the LINQ query into the client-side query and the one or more server-side queries, query processing module 204 automatically determines whether the client-side query is efficient (316). Query processing module 204 determines whether the client-side query is efficient by applying a set of rules. For example, query processing module 204 may determine that the client-side query is not efficient when the number of server-side queries needed as an input set to the client-side query is greater than the number of database tables referenced in the LINQ query. FIG. 4, described in detail below, illustrates an example operation to determine whether the client-side query is efficient.

If query processing module 204 determines that the client-side query is not efficient ("NO" of 316), query processing module 204 automatically determines whether the querying client selected execution of inefficient queries (318). The querying client may select execution of inefficient queries in a variety of ways. For example, the querying client may pass a flag to query processing module 204, the flag indicating that the querying client has selected execution of inefficient queries. In another example, the querying client may provide the LINQ query to query processing module 204 by invoking a method associated with execution of inefficient queries.

In response to determining that the querying client has not selected execution of inefficient queries ("NO" of 318), query processing module 204 automatically returns an error message to the client application (320). The error message alerts the client application that the LINQ query is not efficient and that query processing module 204 will not process the LINQ query. In response to the error message, a developer of the querying client may modify the querying client such that the querying client provides an efficiently-formatted query. In this way, query processing module 204 prevents front-end system 108 from processing an inefficient LINQ query unless explicitly instructed to do so.

On the other hand, if query processing module 204 determines that the client-side query is efficient ("YES" of 316), or if query processing module 204 determines that the querying client has selected execution of inefficient queries ("YES" of 318), query processing module 204 automatically translates the server-side queries into one or more supplemental CAML queries (322).

Next, query processing module 204 automatically dispatches the one or more supplemental CAML queries (324). A discussed above, dispatching a query means using the query to retrieve a result set responsive to the query. Query processing module 204 may dispatch the supplemental CAML queries in a variety of ways. For example, query processing module 204 may send the supplemental CAML queries directly to database management system 110. In another example, query processing module 204 may translate the supplemental CAML queries into another query language and send the resulting queries to database management system 110.

After dispatching the one or more supplemental CAML queries, query processing module 204 automatically receives one or more server-side result sets (326). The server-side result sets contain data items responsive to the supplemental CAML queries. Because the one or more supplemental CAML queries are translations of the server-side queries, the server-side result sets contain data items responsive to the server-side queries. Query processing module 204 may receive the server-side result sets directly from database management system 110.

Query processing module 204 then automatically generates a client-side query object (328). The client-side query object is a software object representing a client-side result set. The client-side result set is a result set generated by querying the one or more server-side result sets using the client-side query. The client-side query object produces the client-side result set by querying the one or more server-side result sets using the client-side query. In one example implementation, the client-side query object includes methods and/or operators enabling the querying client to iterate through data items in the client-side result set.

Query processing module 204 may generate the client-side query object in a variety of ways. For example, query processing module 204 may use the LINQ-to-Objects provider in the LINQ software package provided by Microsoft Corporation. The LINQ-to-Objects provider converts the client-side query into an expression tree. The expression tree preserves the high level structure of the client-side query. In addition, the LINQ-to-Objects provider also generates a dynamic method. The dynamic method is used to extract the client-side result set from the one or more server-side result sets.

After generating the client-side query object, query processing module 204 uses the client-side query object to query the server-side result sets to obtain the client-side result set (330). For example, query processing module 204 may use a method of the client-side query object to iterate through data items in the client-side result set.

After query processing module 204 has obtained the result set of the unsupported part of the LINQ query, query processing module 204 returns the client-side result set to the querying client as the result set of the LINQ query (332). In this way, the querying client receives the result set responsive to the LINQ query even though the LINQ query was not actually dispatched to database management system 110. Query processing module 204 may return the client-side result set to the querying client in a variety of ways. For example, query processing module 204 may return a reference to the client-side query object.

In the example of FIG. 3, when the querying client receives the result set of the LINQ query in step 332 or in step 312, the querying client uses data items in the result set to generate a web page (334). For example, the result set may include a set of titles of documents in a document library. In this example, the querying client may generate a web page listing each title in the set of titles. In a second example, the querying client may use data items in result set to indirectly generate the web page. In this second example, the data items in the result set may be configuration settings that control how the querying client generates the web page. The querying client then sends the web page to client computing system 102 (336). Client computing system 102 is configured to display the web page. It should be appreciated that the querying client may use the result set in many other ways, some of which do not in any way involve the generation or transmission of web pages.

FIG. 4 is a flowchart illustrating an example operation 400 of query processing module 204 to determine whether a client-side query is efficient. It should be appreciated that operation 400 is merely an example operation of query processing module 204. Many other operations of query processing module 204 are possible. For instance, other operations of query processing module 204 may include more or fewer steps. In other instances, operations of query processing module 204 may include the steps of operation 400 in different orders.

Operation 400 begins when query processing module 204 receives the client-side query (402). Upon receiving the client-side query, query processing module 204 determines whether the number of server-side queries required by the client-side query (abbreviated in FIG. 4 as "Q") is greater than the number of database tables referred to by the original query (abbreviated in FIG. 4 as "L") (404). In response to determining that the number of server-side queries required by the client-side query (Q) is greater than the number of database tables referred to by the original query (L) ("YES" of 404), query processing module 204 determines that the client-side query is not efficient (406). For example, if the original query refers to four tables in database 112 and six server-side queries are required to retrieve the data sets needed to process the client-side query, query processing module 204 determines that the client-side query is not efficient.

In response to determining that the number of server-side queries required by the client-side query (Q) is not greater than the number of database tables referred to in the original query (L) ("NO" of 404), query processing module 204 determines whether the number of rows in the server-side result set (abbreviated in FIG. 4 as "$R_S$") is greater than the number of rows in the result set after application of the where clause of the original query and before application of the aggregation clause of the original query (abbreviated in FIG. 4 as "$R_F$") (408). As used in this disclosure, a row is a row in a database table. In many implementations, there is one data item per row, each data item having a set of columns.

In response to determining that the number of rows in the server-side result set ($R_S$) is greater than the number of rows in the result set after application of the where clause of the original query and before application of the aggregation clause of the original query ($R_F$) ("YES" of 408), query processing module 204 determines that the client-side query is not efficient (406). Query processing module 204 determines that the client-side query is not efficient in this scenario because the server-side result set includes at least one row that query processing module 204 filters out of the server-side result set when query processing module 204 applies the where clause to the result set. In other words, the server-side result set includes one or more redundant rows. This situation may arise when the original query includes an unsupported where clause or an unsupported join clause. Because the where clause is not supported, query processing module 204 applies the where clause instead of database management system 110. Consequently, when the where clause is not supported, database management system 110 send rows that will be filtered out by the where clause at query processing module 204.

On the other hand, if query processing module 204 determines that the number of rows in the server-side result set ($R_S$) is not greater than the number of rows in the result set after application of the where clause of the original query and before application of the aggregation clause of the original query ($R_F$) ("NO" of 408), query processing module 204 determines whether the number of server-side queries (Q) is less than or equal to the number of database tables referenced in the original query (L) and whether the number of rows in the server-side result set ($R_S$) is less than or equal to the number of rows in the client-side result set ($R_C$) (410). If query processing module 204 determines that the number of server-side queries (Q) is less than or equal to the number of database tables referenced in the original query (L) and whether the number of rows in the server-side result set ($R_S$) is less than or equal to the number of rows in the client-side result set ($R_C$) ("YES" of 410), query processing module 204 determines that the client-side query is efficient (412). Query processing module 204 determines that the client-side query is efficient in this scenario because the server-side result set does not include any rows not used in the client-side result set and query processing module 204 does not need to send server-side queries to a single database table.

If the number of server-side queries (Q) is not less than or equal to the number of database tables referenced in the original query (L) or if the number of rows in the server-side result set ($R_S$) is not less than or equal to the number of rows in the client-side result set ($R_C$) ("NO of 410"), query processing module 204 determines whether the number of rows in the server-side result set ($R_S$) is less than or equal to the number of rows in the result set after application of the where clause and before application of the aggregation clause ($R_F$) and whether the number of rows in the result set after application of the where clause and before application of the aggregation clause ($R_F$) is greater than the number of rows in the client-side result set ($R_C$) (414).

In response to determining that the number of rows in the server-side result set ($R_S$) is less than or equal to the number of rows in the result set after application of the where clause and before application of the aggregation clause ($R_F$) and that the number of rows in the result set after application of the where clause and before application of the aggregation clause ($R_F$) is greater than the rows in the client-side result set ($R_C$) ("YES" of 414), query processing module 204 determines that the client-side query is efficient (412). This scenario can arise when the original query includes a supported where clause and an unsupported aggregation clause. Because the where clause is supported, database management system 110 applies the where clause. Consequently, the server-side result set does not include rows filtered out by the where clause. Because the aggregation clause is not supported, query processing module 204 applies the aggregation clause. In this scenario, if database management system 110 completely applies the where clause, $R_S$ is equal to $R_F$. If database management system 110 completely applies the where clause and some of the aggregation clause, $R_S$ is less than $R_F$. In this scenario, query processing module 204 is able to determine that database system 108 does not return any unneeded rows when $R_S <= R_F$ and $R_F > R_C$.

On the other hand, if query processing module 204 determines that the number of rows in the server-side result set ($R_S$) is not less than or equal to the number of rows in the result set after application of the where clause and before application of the aggregation clause ($R_F$) or that the number of rows in the result set after application of the where clause and before application of the aggregation clause ($R_F$) is not greater than the rows in the client-side result set ($R_C$) ("YES" of 414), query processing module 204 determines whether the number of columns in the server-side result set (abbreviated in FIG. 4 as "$C_S$") is greater than the number of columns in the client-side result set (abbreviated in FIG. 4 as "$C_C$") (416). In response to determining that the number of columns in the server-side result set ($C_S$) is not greater than the number of columns in the client-side result set ($C_C$) ("NO" of 416), query processing module 204 determines that the client-side query is not efficient (406). Query processing module 204 determines that the client-side query is not efficient in this situation because processing the client-side query requires the one or more server-side queries to retrieve unneeded columns from database system 108. This situation may arise when the original query includes an unsupported select clause.

In response to determining that the number of columns in the server-side result set ($C_S$) is greater than the number of columns in the client-side result set ($C_C$) ("YES" of 416), query processing module 204 determines that the client-side query is efficient (412).

Figure 5:
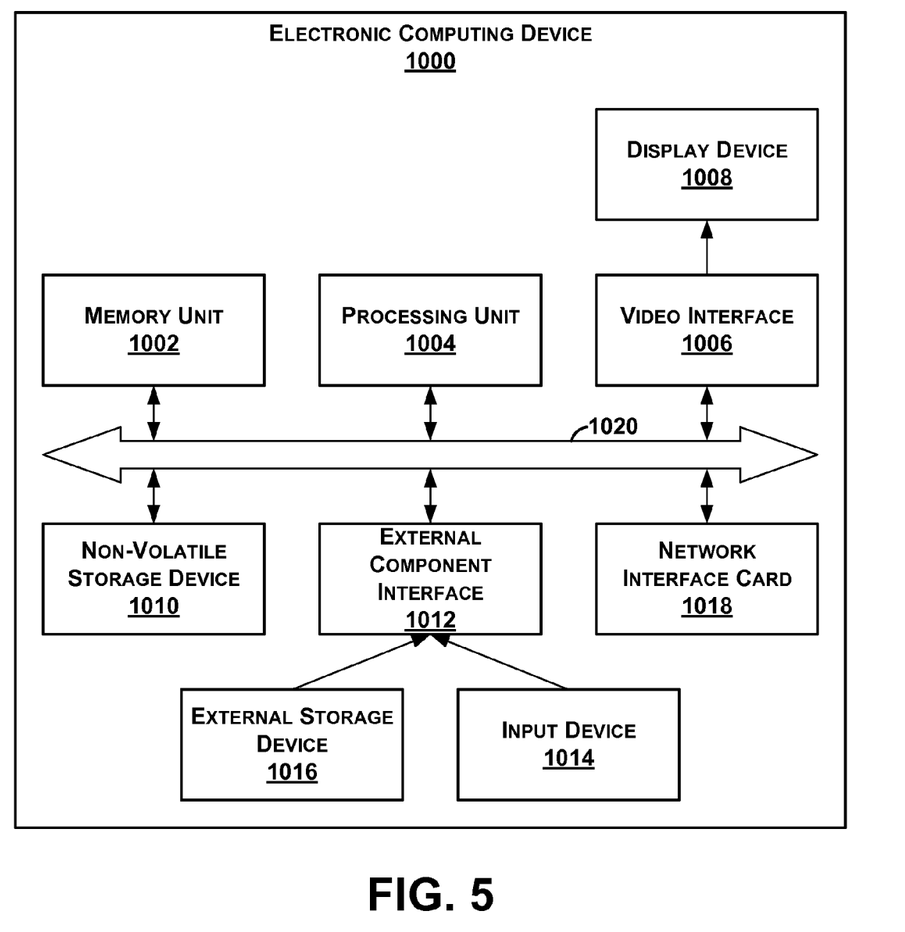
FIG. 5 is a block diagram illustrating example physical components of an electronic computing system.

FIG. 5 is a block diagram illustrating example physical components of an electronic computing device 500. As illustrated in the example of FIG. 5, electronic computing device 500 comprises a memory unit 502. Memory unit 502 is a computer-readable data storage medium capable of storing data and/or instructions. Memory unit 502 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, electronic computing device 500 comprises a processing unit 504. As mentioned above, a processing unit is a set of one or more physical electronic integrated circuits that are capable of executing instructions. In a first example, processing unit 504 may execute software instructions that cause electronic computing device 500 to provide specific functionality. In this first example, processing unit 504 may be implemented as one or more processing cores and/or as one or more separate microprocessors. For instance, in this first example, processing unit 504 may be implemented as one or more Intel Core 2 microprocessors. Processing unit 504 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 504 may be implemented as an ASIC that provides specific functionality. In a third example, processing unit 504 may provide specific functionality by using an ASIC and by executing software instructions.

Electronic computing device 500 also comprises a video interface 506. Video interface 506 enables electronic computing device 500 to output video information to a display device 508. Display device 508 may be a variety of different types of display devices. For instance, display device 508 may be a cathode-ray tube display, an LCD display panel, a plasma screen display panel, a touch-sensitive display panel, a LED array, or another type of display device.

In addition, electronic computing device 500 includes a non-volatile storage device 510. Non-volatile storage device 510 is a computer-readable data storage medium that is capable of storing data and/or instructions. Non-volatile storage device 510 may be a variety of different types of non-volatile storage devices. For example, non-volatile storage device 510 may be one or more hard disk drives, magnetic tape drives, CD-ROM drives, DVD-ROM drives, Blu-Ray disc drives, or other types of non-volatile storage devices.

Electronic computing device 500 also includes an external component interface 512 that enables electronic computing device 500 to communicate with external components. As illustrated in the example of FIG. 5, external component interface 512 enables electronic computing device 500 to communicate with an input device 514 and an external storage device 516. In one implementation of electronic computing device 500, external component interface 512 is a Universal Serial Bus (USB) interface. In other implementations of electronic computing device 500, electronic computing device 500 may include another type of interface that enables electronic computing device 500 to communicate with input devices and/or output devices. For instance, electronic computing device 500 may include a PS/2 interface. Input device 514 may be a variety of different types of devices including, but not limited to, keyboards, mice, trackballs, stylus input devices, touch pads, touch-sensitive display screens, or other types of input devices. External storage device 516 may be a variety of different types of computer-readable data storage media including magnetic tape, flash memory modules, magnetic disk drives, optical disc drives, and other computer-readable data storage media.

In addition, electronic computing device 500 includes a network interface card 518 that enables electronic computing device 500 to send data to and receive data from an electronic communication network. Network interface card 518 may be a variety of different types of network interface. For example, network interface card 518 may be an Ethernet interface, a token-ring network interface, a fiber optic network interface, a wireless network interface (e.g., WiFi, WiMax, etc.), or another type of network interface.

Electronic computing device 500 also includes a communications medium 520. Communications medium 520 facilitates communication among the various components of electronic computing device 500. Communications medium 520 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Electronic computing device 500 includes several computer-readable data storage media (i.e., memory unit 502, non-volatile storage device 510, and external storage device 516). Together, these computer-readable storage media may constitute a single data storage system. As discussed above, a data storage system is a set of one or more computer-readable data storage mediums. This data storage system may store instructions executable by processing unit 504. Activities described in the above description may result from the execution of the instructions stored on this data storage system. Thus, when this description says that a particular logical module performs a particular activity, such a statement may be interpreted to mean that instructions of the logical module, when executed by processing unit 504, cause electronic computing device 500 to perform the activity. In other words, when this description says that a particular logical module performs a particular activity, a reader may interpret such a statement to mean that the instructions configure electronic computing device 500 such that electronic computing device 500 performs the particular activity.

The techniques of this disclosure may be realized in many ways. For example, the techniques of this disclosure may be realized as a method of processing queries. The method comprises receiving, at a computing system, an original query from a querying client, the original query expressed in a first query language. The method also comprises automatically determining, at the computing system, whether the original query includes a clause unsupported by a second query language. In addition, the method comprises in response to determining that the original query includes a clause unsupported by the second query language, automatically separating, at the computing system, the original query into a server-side query and a client-side query. The server-side query comprises supported clauses of the original query. The client-side query comprises unsupported clauses of the original query. In addition, the method comprises after separating the original query into the server-side query and the client-side query, automatically determining, at the computing system, whether the client-side query is efficient. Moreover, the method comprises automatically translating, at the computing system, the server-side query into a supplemental query expressed in the second query language. In addition, the method comprises automatically receiving, at the computing system, a server-side result set from a database management system. The database management system manages a database. The server-side result set comprises data items in the database responsive to the supplemental query. The method also comprises when the computing system determines that the client-side query is efficient, automatically generating, by the computing system, a client-side result set by querying the server-side result set using the client-side query. In addition, the method comprises automatically returning, by the computing system, the client-side result set to the querying client as a result set of the original query.

In another example the techniques of this disclosure may be realized as an electronic computing system. The electronic computing system comprises a processing unit comprising a set of at least one integrated circuit. The electronic computing system also comprises a data storage system comprising a set of at least one computer-readable data storage medium, the data storage system storing a set of instructions that, when executed by the processing unit, configure the electronic computing system to receive an original query from a querying client, the original query expressed in a first query language. The instructions also configure the electronic computing system to automatically determine whether the original query includes a clause unsupported by a second query language. In addition, the instructions configure the electronic computing system to automatically separate, in response to determining that the original query includes an clause unsupported by the second query language, the original query into a server-side query and a client-side query, the server-side query comprising supported clauses of the original query, the client-side query comprising unsupported clauses of the original query. The instructions also configure the electronic computing system to automatically determine, after separating the original query into the server-side query and the client-side query, whether the client-side query is efficient. Moreover, the instructions configure the electronic computing system to automatically send, in response to determining that the client-side query is not efficient, an error message to the querying client. The error message indicates to the querying client that the computing system did not execute the original query because the original query is not efficient. The instructions also configure the electronic computing system to automatically translate the server-side query into a supplemental query expressed in the second query language. In addition, the instructions configure the electronic computing system to automatically dispatch the server-side query. Moreover, the instructions configure the electronic computing system to automatically receive, after dispatching the server-side query, a server-side result set from a database management system. The database management system manages a database. The server-side result set comprises data items in the database responsive to the supplemental query. The instructions also configure the electronic computing system to automatically generate, when the computing system determines that the client-side query is efficient, a client-side result set by querying the server-side result set using the client-side query. In addition, the instructions configure the electronic computing system to automatically return the client-side result set to the querying client as a result set of the original query.

In another example, the techniques of this disclosure may be realized as a computer-readable data storage medium comprising computer-executable instructions that, when executed by a processing unit of an electronic computing system, configure the electronic computing system such that the electronic computing system receives an original query from a querying client, the original query expressed in a Language Integrated Query (LINQ) query language. The instructions further configure the electronic computing system such that the electronic computing system automatically determines whether the original query includes a clause unsupported by a Collaborative Application Markup Language (CAML) query language. In addition, the instructions further configure the electronic computing system such that the electronic computing system automatically separates, in response to determining that the original query includes an clause unsupported by the CAML query language, the original query into a client-side query and at least one server-side query, the server-side query comprising supported clauses of the original query, the client-side query comprising unsupported clauses of the original query. Moreover, the instructions further configure the electronic computing system such that the electronic computing system automatically determines, after separating the original query into the server-side query and the client-side query, whether the client-side query is efficient, the client-side query being efficient when the client-side query does not require retrieval of redundant data from a database. The instructions also configure the electronic computing system such that the electronic computing system automatically translates the server-side query into a supplemental query expressed in the CAML query language. The instructions further configure the electronic computing system such that the electronic computing system automatically dispatches the server-side query. In addition, the instructions further configure the electronic computing system such that the electronic computing system automatically receives, after dispatching the server-side query, a server-side result set from a database management system, the database management system managing the database, the server-side result set comprising data items in the database responsive to the supplemental query. Moreover, the instructions further configure the electronic computing system such that the electronic computing system automatically generates, when the electronic computing system determines that the client-side query is efficient, a client-side result set by querying the server-side result set using the client-side query. The instructions further configure the electronic computing system such that the electronic computing system automatically returns, when the electronic computing system determines that the client-side query is efficient, the client-side result set to the querying client as a result set of the original query. In addition, the instructions further configure the electronic computing system such that the electronic computing system automatically determines, when the computing system determines that the client-side query is not efficient, whether execution of inefficient queries selected. Furthermore, the instructions configure the electronic computing system such that the electronic computing system automatically generates, when the electronic computing system determines that the client-side query is not efficient and determines that execution of inefficient queries is selected, the client-side result set by querying the server-side result set using the client-side query. In addition, the instructions configure the electronic computing system such that the electronic computing system automatically sends, in response to determining that the client-side query is not efficient and that execution of inefficient queries is not selected, an error message to the querying client, the error message indicating to the querying client that the electronic computing system did not execute the original query because the original query is not efficient.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of processing queries, the method comprising:
    receiving, at a computing system, an original query from a querying client, the original query expressed in a first query language, wherein the first query language is Language Integrated Query (LINQ);
    automatically determining, at the computing system, whether the original query includes a clause unsupported by a second query language, wherein the second query language is Collaborative Application Markup Language (CAML);
    in response to determining that the original query includes a clause unsupported by the second query language, automatically separating, at the computing system, the original query into a server-side query and a client-side query, the server-side query comprising supported clauses of the original query, the client-side query comprising unsupported clauses of the original query;
    after separating the original query into the server-side query and the client-side query, automatically determining, at the computing system, whether the client-side query is efficient;
    automatically translating, at the computing system, the server-side query into a supplemental query expressed in the second query language;
    automatically receiving, at the computing system, a server-side result set from a database management system, the database management system managing a database, the server-side result set comprising data items in the database responsive to the supplemental query;
    when the computing system determines that the client-side query is efficient, automatically generating, by the computing system, a client-side result set by querying the server-side result set using the client-side query; and
    automatically returning, by the computing system, the client-side result set to the querying client as a result set of the original query.

2. The method of claim 1, wherein automatically determining, at the computing system, whether the client-side query is efficient comprises: determining, at the computing system, that the client-side query is not efficient when a number of supplemental queries required to generate the server-side result set is greater than a number of database tables specified by the original query.

3. The method of claim 2, wherein automatically determining, at the computing system, whether the client-side query is efficient further comprises: determining, at the computing system, that the client-side query is not efficient when a number of columns in the server-side result set is less than or equal to a number of columns in the client-side result set.

4. The method of claim 2,
    wherein the original query includes a from clause, a where clause, and an aggregation clause; and
    wherein automatically determining, at the computing system, whether the client-side query is efficient further comprises: determining, at the computing system, that the client-side query is not efficient when a number of rows in the server-side result set is greater than a number of rows in an intermediate result set, the intermediate result set including data items in a database table indicated by the from clause after application of the where clause and before application of the aggregation clause.

5. The method of claim 1, wherein automatically separating the original query into the server-side query and the client-side query comprises:
    automatically identifying, at the computing system, one or more unsupported clauses in the original query, the unsupported clauses being unsupported by the second query language;
    automatically generating, at the computing system, the client-side query, the client-side query including the unsupported clauses;

automatically generating, at the computing system, the server-side query, the server-side query including at least one clause in the original query supported by the second query language.

6. The method of claim 5, wherein one of the unsupported clauses is selected from a group of clauses consisting of: a where clause, a select clause, and a group by clause.

7. The method of claim 5,
wherein the server-side query is a first server side query, the supplemental query is a first supplemental query, the server-side result set is a first server-side result set;
wherein automatically separating the original query into the server-side query and the client-side query further comprises: automatically generating, at the computing system, a second server-side query, the second server side query including at least one clause in the original query supported by the second query language;
wherein the method further comprises:
automatically translating, at the computing system, the second server-side query into a second supplemental query expressed in the second query language; and
automatically receiving, at the computing system, a second server-side result set, the second server-side result set comprising data items in the database responsive to the second supplemental query; and
wherein automatically generating the client-side result set comprises querying the first server-side result set and the second server-side result set using the client-side query.

8. The method of claim 1 further comprising: in response to determining that the client-side query is not efficient, automatically sending, at the computing system, an error message to the querying client, the error message indicating to the querying client that the computing system did not execute the original query because the original query is not efficient.

9. The method of claim 1 further comprising:
automatically determining, at the computing system, whether execution of inefficient queries is selected; and
when the computing system determines that the client-side query is not efficient and determines that execution of inefficient queries is selected, automatically generating, by the computing system, the client-side result set by querying the server-side result set using the client-side query.

10. The method of claim 1 further comprising:
in response to determining that the original query does not include a clause unsupported by the second query language, automatically translating, at the computing system, the original query into a translated query expressed in the second query language;
after translating the original query into the translated query, receiving, at the computing system, a result set for the translated query from the database, the result set for the translated query comprising data items responsive to the translated query; and
after receiving the result set for the translated query, automatically returning, by the computing system, the result set for the translated query to the querying client as the result set of the original query.

11. The method of claim 1, wherein the querying client is an application operating at the computing system.

12. The method of claim 1 further comprising:
automatically translating, at the computing system, the supplemental query into a second supplemental query expressed in a third query language;
after translating the supplemental query into the second supplemental query, automatically sending, by the computing system, the second supplemental query to the database management system, the database management system executing the second supplemental query and returning the server-side result set.

13. The method of claim 1,
wherein the method further comprises automatically converting, at the computing system, the client-side query into a software object representing the client-side result set, the software object comprising methods enabling iteration through data items in the client-side result set; and
wherein automatically returning the client-side result set comprises automatically returning, by computing system, a reference to the software object.

14. The method of claim 1,
wherein the computing system is a server computing system; and
wherein the method further comprises:
using, at the computing system, data items in the result set of the original query to generate a web page; and
sending, by the computing system, the web page to a client computing system configured to display the web page to the user.

15. An electronic computing system comprising:
a processing unit comprising a set of at least one integrated circuit; and
a data storage system comprising a set of at least one computer-readable data storage medium, the data storage system storing a set of instructions that, when executed by the processing unit, configure the electronic computing system to:
receive an original query from a querying client, the original query expressed in a first query language;
automatically determine whether the original query includes a clause unsupported by a second query language;
automatically separate, in response to determining that the original query includes an clause unsupported by the second query language, the original query into a server-side query and a client-side query, the server-side query comprising supported clauses of the original query, the client-side query comprising unsupported clauses of the original query;
automatically determine, after separating the original query into the server-side query and the client-side query, whether the client-side query is efficient;
automatically send, in response to determining that the client-side query is not efficient, an error message to the querying client, the error message indicating to the querying client that the computing system did not execute the original query because the original query is not efficient;
automatically translate the server-side query into a supplemental query expressed in the second query language;
automatically dispatch the server-side query;
automatically receive, after dispatching the server-side query, a server-side result set from a database management system, the database management system managing a database, the server-side result set comprising data items in the database responsive to the supplemental query;
automatically generate, when the computing system determines that the client-side query is efficient, a client-side result set by querying the server-side result set using the client-side query; and
automatically return the client-side result set to the querying client as a result set of the original query.

16. The electronic computing system of claim 15, the instructions further configuring the electronic computing system to:
- automatically determine whether execution of inefficient queries selected; and
- automatically generate, when the electronic computing system determines that the client-side query is not efficient and determines that execution of inefficient queries is selected, the client-side result set by querying the server-side result set using the client-side query.

17. The electronic computing system of claim 15, the instructions further configuring the electronic computing system to:
- automatically translate, in response to determining that the original query does not include a clause unsupported by the second query language, the original query into a translated query expressed in the second query language;
- receive, after translating the original query into the translated query, a result set for the translated query from the database, the result set for the translated query comprising data items responsive to the translated query; and
- automatically return, after receiving the result set for the translated query, the result set for the translated query to the querying client as the result set of the original query.

18. The electronic computing system of claim 15,
- wherein the instructions further configure the electronic computing system to automatically convert the client-side query into a software object representing the client-side result set, the software object comprising methods enabling iteration through data items in the client-side result set; and
- wherein the instructions that configure the electronic computing system to automatically return the client-side result set configure the electronic computing system to automatically return to the querying client a reference to the software object.

19. A computer-readable data storage medium comprising computer-executable instructions that, when executed by a processing unit of an electronic computing system, configure the electronic computing system such that the electronic computing system:
- receives an original query from a querying client, the original query expressed in a Language Integrated Query (LINQ) query language;
- automatically determines whether the original query includes a clause unsupported by a Collaborative Application Markup Language (CAML) query language;
- automatically separates, in response to determining that the original query includes an clause unsupported by the CAML query language, the original query into a client-side query and at least one server-side query, the server-side query comprising supported clauses of the original query, the client-side query comprising unsupported clauses of the original query;
- automatically determines, after separating the original query into the server-side query and the client-side query, whether the client-side query is efficient, the client-side query being efficient when the client-side query does not require retrieval of redundant data from a database;
- automatically translates the server-side query into a supplemental query expressed in the CAML query language;
- automatically dispatches the server-side query;
- automatically receives, after dispatching the server-side query, a server-side result set from a database management system, the database management system managing the database, the server-side result set comprising data items in the database responsive to the supplemental query;
- automatically generates, when the electronic computing system determines that the client-side query is efficient, a client-side result set by querying the server-side result set using the client-side query;
- automatically returns, when the electronic computing system determines that the client-side query is efficient, the client-side result set to the querying client as a result set of the original query;
- automatically determines, when the computing system determines that the client-side query is not efficient, whether execution of inefficient queries selected;
- automatically generates, when the electronic computing system determines that the client-side query is not efficient and determines that execution of inefficient queries is selected, the client-side result set by querying the server-side result set using the client-side query; and
- automatically sends, in response to determining that the client-side query is not efficient and that execution of inefficient queries is not selected, an error message to the querying client, the error message indicating to the querying client that the electronic computing system did not execute the original query because the original query is not efficient.

* * * * *